Oct. 31, 1967  R. L. A. TRECHOT  3,349,514
APPARATUS FOR THE CAPTURE OF LIVE ANIMALS
Filed Jan. 25, 1967  3 Sheets-Sheet 2
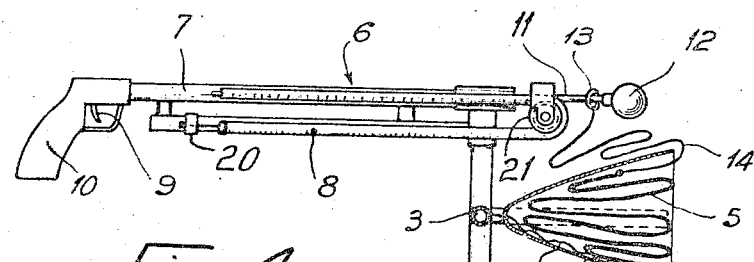
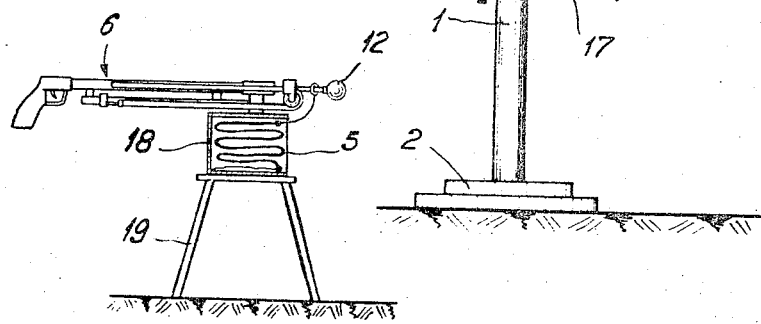
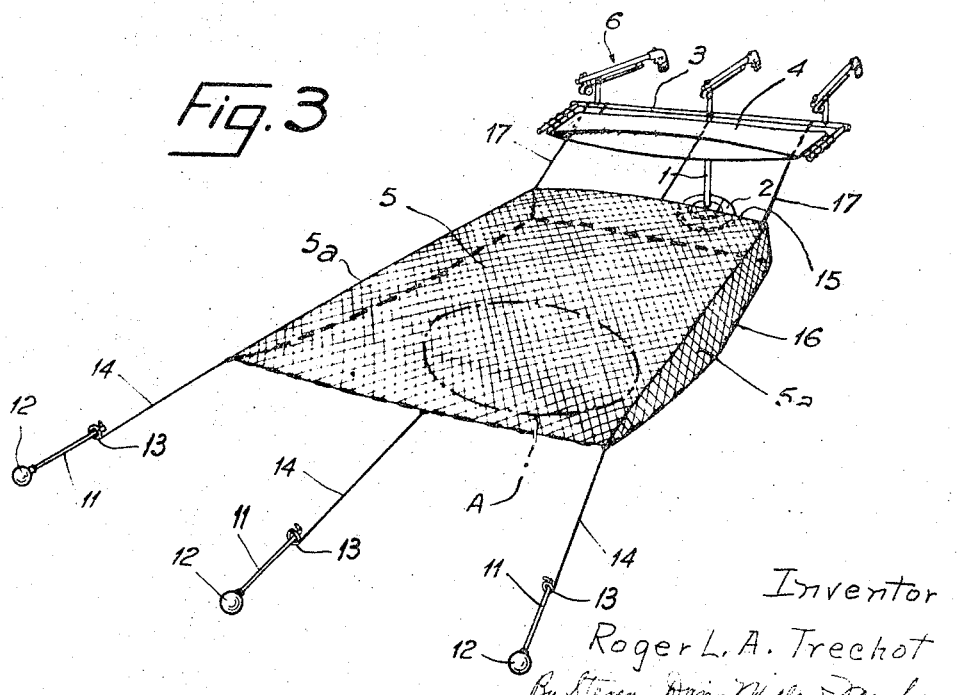
Inventor
Roger L. A. Trechot Oct. 31, 1967  R. L. A. TRECHOT  3,349,514
APPARATUS FOR THE CAPTURE OF LIVE ANIMALS
Filed Jan. 25, 1967  3 Sheets-Sheet 3

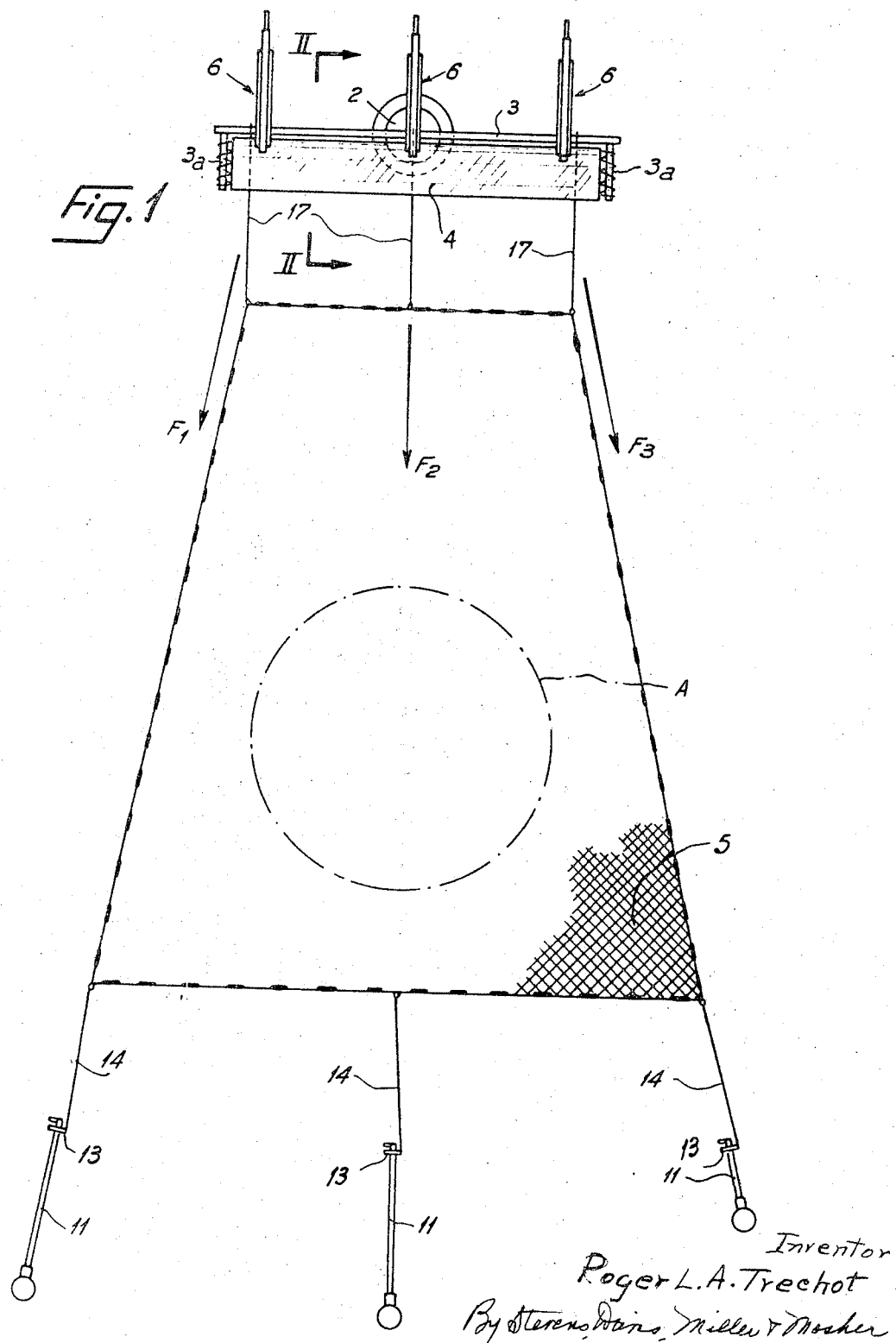

INVENTOR
Roger L. A. Trechot

BY Stevens, Davis, Miller & Mosher
ATTORNEYS

# United States Patent Office 3,349,514
Patented Oct. 31, 1967

3,349,514
APPARATUS FOR THE CAPTURE OF LIVE ANIMALS
Roger L. A. Trechot, 9 Ave. Sainte Foy,
Neuilly-sur-Seine, France
Filed Jan. 25, 1967, Ser. No. 629,040
Claims priority, application France, Oct. 25, 1963, 951,850, Patent 1,380,756
7 Claims. (Cl. 43—60)

ABSTRACT OF THE DISCLOSURE

An animal capturing apparatus having an elongated net with weighted edges for spreading over the animals to be captured, the net being tethered at one of its ends and being adapted to fold within a container. Means are provided for launching a plurality of weighted members to which the other end of the net is freely attached to spread the net, the weighted members being allowed to reach their maximum speed after launching before they pull the net out of the container.

*Cross references to related applications*

This is a continuation-in-part application of applicant's U.S. patent application Ser. No. 402,820, filed Oct. 9, 1964 and now abandoned.

*Background of the invention*

(1) *Field of the invention.*—This invention relates to an apparatus for the capture of live animals or groups of live animals on the ground after the latter have been lured by an appropriate bait and more particularly, to such an apparatus which utilizes a net with weighted sides which is spread out and drops over the animals.

The apparatus of the present invention has been found particularly useful in the capture of pigeons, especially since the latter have given rise to serious problems in many areas.

*Summary of the invention*

The apparatus according to the present invention comprises the use of a net with weighted sides which is spread out and drops over the animals. The net is tethered at one of its ends, is folded within a container, and has its opposite end freely attached to a plurality of weighted members.

The apparatus of the present invention further comprises a plurality of launchers each adapted to launch a weighted member by elastic energy, each of the said weighted members being connected to the net by a lost-motion connection which allows the net to be driven only when the weighted member has been separated from its launcher. In this way the weighted member reaches its maximum speed by the complete expansion of the means which provides the elastic energy.

Thus the energy required to spread out the net can be adjusted with precision by the value of the propelled weighted members and the value of the speeds imparted to them. Also, premature driving of the net does not brake the movement of these weighted members nor disturb the amount of energy imparted to them by their launching.

In one advantageous embodiment of the present invention, the weighted members are arrows with weighted heads and are launched by launchers comprising a propulsive bow as used on land, or, preferably, comprising a pair of rubber ropes as used in the well known guns used for underwater fishing.

In the particular operation of the apparatus of the present invention, a slack string is secured to the net and to a ring in which the arrow slides before it is arrested by an enlarged butt formed on the arrow to enable the arrow to reach its maximum speed before it drives the net.

The launcher preferably comprises a tubular gun to receive the arrow before launching and a ring connected to the net by a string can slide over the arrow provided with a butt.

The net is preferably in the form of an inverted trapezoidal dish so as to spread out like a cage over the animals it is required to capture. Before launching, the net is placed in superposed folds in a container open in the direction into which the net is to be launched. This container may be in the form of a bag formed by a strip of material folded longitudinally, the ends being held by rigid supports, or it may be in the form of a box which can be used as a stand for the cross-bows.

*Brief description of the drawings*

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope.

FIG. 1 is a plan view of one embodiment of apparatus according to the present invention in its extended form;
FIG. 2 is an enlarged vertical section on the line II—II in FIG. 1, with the device in the inoperative position;
FIG. 3 is a perspective view of the device after being launched;
FIG. 4 is a vertical section, similar to FIG. 2, of a modified form of the device of the present invention.

*Description of the preferred embodiments*

Figure 5:
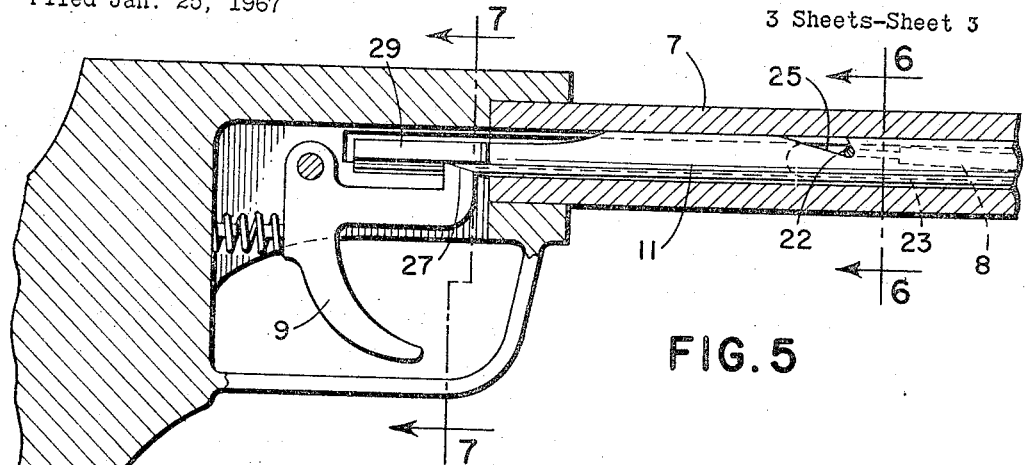
FIG. 5 is a partial vertical sectional view of the device of the present invention.
Figure 7:
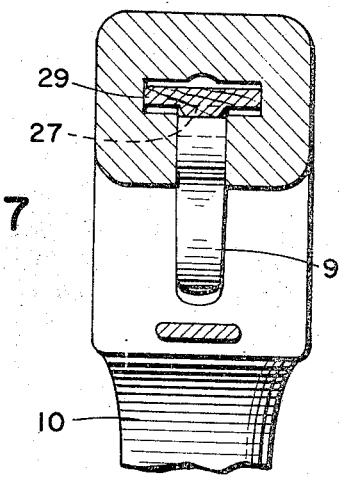
FIGS. 6 and 7 are cross-sectional views taken along lines VI—VI and VII—VII, respectively.
Figure 6:
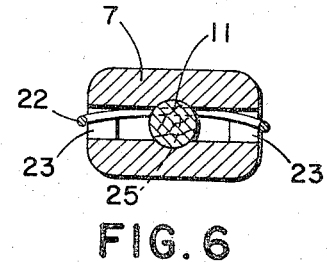

As shown in FIGS. 1 to 3, the apparatus of the present invention includes an upright member 1 which is supported on a base 2 and is advantageously in two telescoping parts which are slidable for heightwise adjustment. A horizontal cross-member 3, provided with end portions 3a at right angles thereto, is secured to the upright 1. Between the ends 3a is secured a container 4 which is formed from a strip of material which is folded in two, and which acts as a flexible case for a net 5.

As seen in FIGS. 1 and 3, a plurality of upright members may be provided, each of which is connected to cross-member 3 and each of which carries a launcher 6.

As specifically shown in FIGS. 2 and 5–7, the launchers 6 are of a generally known type, and each comprises a barrel 7 adapted to receive an arrow 11. On either side of barrel 7 is located a rubber rope 8, one end of which is secured to the launcher at 20. Each rope passes over a pulley 21 adjacent the end of the barrel and both ropes are connected at their other ends by a short length of steel wire 22 passing through a pair of facing slots 23 in the barrel. As seen in FIG. 5, wire 22 engages notch 25 in arrow 11. When the ropes are tensioned, for example, by manually pushing the arrow into the barrel, a trigger 9 engages another notch 27 in the arrow butt, said trigger being carried in a gun stock 10.

Figure 8:
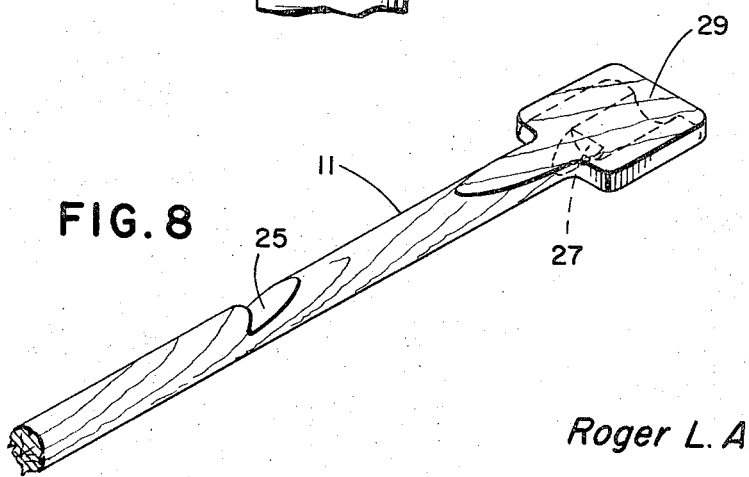
FIG. 8 is a perspective view of arrow 11.

Referring specifically to FIG. 2, the arrow 11, which thus can be projected by the launcher upon actuation of trigger 9, is weighted at the front end by a weight 12 while its butt is retained by the trigger 9. A ring 13, connected by a string 14 to the front end of the net 5, is disposed loosely on the arrow 11 and is arrested by a transverse abutment 29 formed on the arrow butt as seen in FIG. 8, said abutment fitting in a hole of the gun stock to avoid premature release of the rear arrow notch 27 from the trigger 9.

As will be apparent from FIG. 3, when the net 5 spreads out it has the form of an inverted trapezoidal dish and its sides are weighted by lead weights 16. In order not to brake the launching of the net, the dish has walls only along the sides 5a and rear end 15, the latter being connected by strings 17 to the cross-member 3.

The apparatus operates as follows:

The arrows 11 are positioned in the launchers 6 which are cocked, the strings 14 are coiled on the top of the container 4, the strings 17 are coiled at the end of the container, and the net 5 is placed in superposed folds within the container as shown diagrammatically in FIG. 2.

The apparatus is placed in readiness (as shown in FIGS. 1-3) near an area A to which the animals it is required to capture are lured by an appropriate bait. An operator is then stationed at each of the weapons 6, the latter being aimed in divergent directions as shown by the arrows F1, F2, and F3 in FIG. 1.

At the appropriate signal all the triggers 9 of the launchers 6 are operated simultaneously, the arrows are projected outwardly from the barrels and slide in the rings 13. As soon as the arrows are completely discharged from the barrels 7, the abutments 29 on the arrows 11 drive the rings 13 so that the strings 14 extend, and then pull the net 5 out of the container 4, causing the folds of the net to unfold successively. The length of the strings 17 depends on the distance of the apparatus from the area A it is required to cover, and since the strings 17 are secured to the end of the net, they do not brake the dropping of the lead weights on the edge of the inverted dish.

When the net unfolds, the central part thereof, being lighter than the sides, drops less rapidly than the sides so that the net effectively unfolds in the form of a cage as shown in FIG. 3. This cage drops over the area A it is required to cover.

As a result of the provision of the sliding ring 13 and the string 14, the arrow 11 can reach its maximum velocity and then pull the net out of the container 4, without any premature braking of the arrow. The tension of the springs 8, their length, and the mass of the arrows are so selected that the net is fully unfolded, while at the end of their travel the arrows cannot move in the reverse direction by any elastic retractive effect of the net.

Of course, the launchers 6, instead of being pivotable, may be fixed and be permanently pointed in appropriate directions, while the triggers may be actuated simultaneously by a single operator by means of any mechanical, electric or pneumatic control which, if necessary, can be a remote control if the presence of the operator is likely to frighten the animals. For example, this may be simply effected by means of strings or the like, each fastened at one end to the triggers 9, in which case the strings can be manually pulled at their other ends by the operator to release the trigger teeth 9 from their corresponding notches 27.

In the embodiment shown in FIG. 4, the net 5 and the strings 14 and 17 are housed in a case 18, mounted on legs 19. Case 18 extends in a horizontal direction, has strings 17 (not shown) secured thereto, and is open in the forward direction. As shown, the case 18 may also be used as a base for the launchers 6, which are secured thereto.

Of course, instead of the upright 1, or the legs 19, any convenient support may be used, such as a stool, a box, a bench or a stone.

Of course, modifications may be made to the above embodiments, more particularly by the substitution of equivalent technical means, without thereby departing from the scope of the invention as defined in the appended claims.

I claim:

1. Apparatus for capturing live animals comprising an elongated net adapted to spread over the animals to be captured and having weighted sides, a container for said net, said net being tethered at one of its ends and being adapted to fold within said container, a plurality of weighted members, connecting means freely attaching the opposite end of said net to said plurality of weighted members, and means for launching the weighted members, said connecting means allowing said weighted members to reach their maximum speed after launching before they pull the net out of the container.

2. Apparatus according to claim 1, wherein a plurality of said launching means are provided for launching said weighted members, each launching means being adapted to launch a said weighted member by elastic energy, said connecting means including a lost-motion connection which allows the net to be pulled from said container only after the weighted member has been separated from its launching means.

3. Apparatus according to claim 2, wherein the weighted members comprise arrows having a weighted head.

4. Apparatus according to claim 3, wherein each of said launching means comprises a tubular gun to receive one of said arrows, said arrows being provided with a butt, and wherein the lost-motion connection comprises a ring which slides on the arrow and which is retained by the butt of the latter and a string connecting the ring to said opposite end of said net.

5. Apparatus according to claim 2, wherein the net is housed folded in said container which is elongated in the horizontal direction and which opens towards the direction in which the net is to be spread.

6. Apparatus according to claim 5, wherein the container is rigid and provides a stand for the launching means.

7. Apparatus according to claim 5, wherein the net is in the form of an inverted shallow dish and is tethered to said container by fastening means secured to the end of said dish.

References Cited

UNITED STATES PATENTS

| | | | |
|---|---|---|---|
| 722,794 | 3/1903 | Allen | 43—62 |
| 2,732,647 | 1/1956 | Byars | 43—8 |
| 2,891,342 | 6/1959 | Grable et al. | 43—8 |

SAMUEL KOREN, *Primary Examiner.*

W. H. CAMP, *Assistant Examiner.*